C. J. DE COSTER.
ATTACHMENT FOR REELING MACHINES.
APPLICATION FILED SEPT. 3, 1920.

1,416,000.

Patented May 16, 1922.
2 SHEETS—SHEET 1.

Inventor
Charles J. De Coster
by G. M. Campbell
Atty.

C. J. DE COSTER.
ATTACHMENT FOR REELING MACHINES.
APPLICATION FILED SEPT. 3, 1920.
1,416,000.
Patented May 16, 1922.
2 SHEETS—SHEET 2.
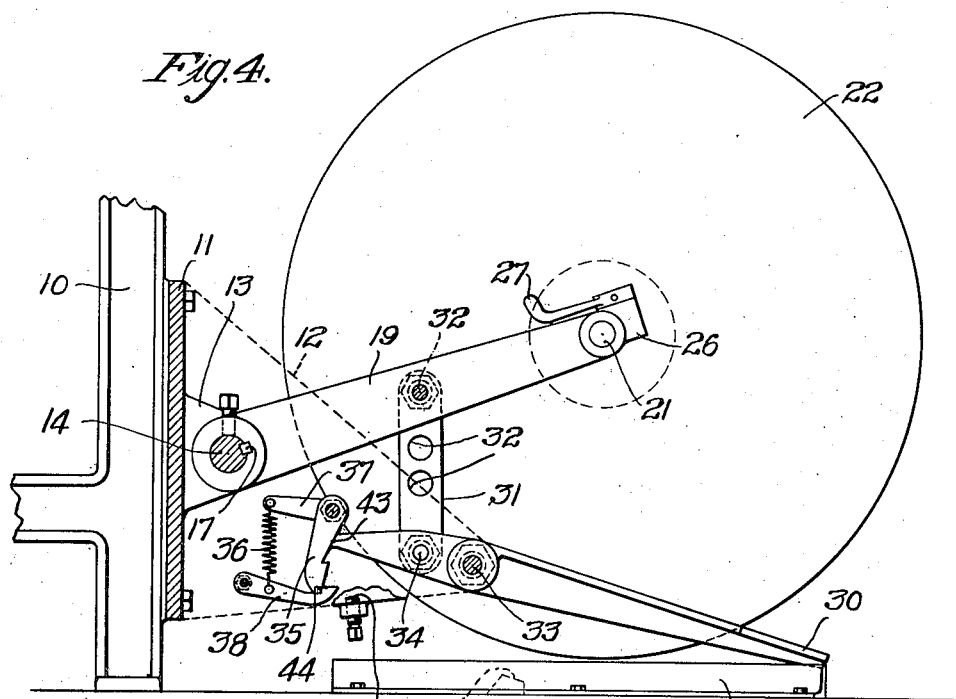
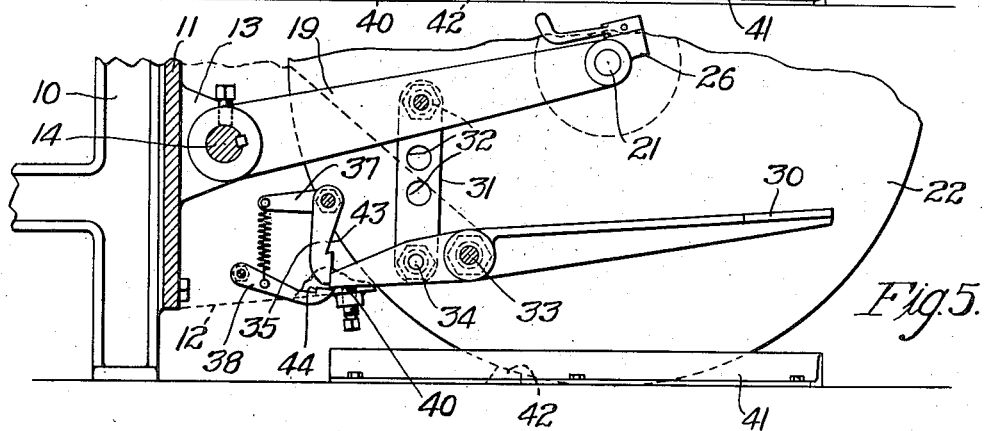
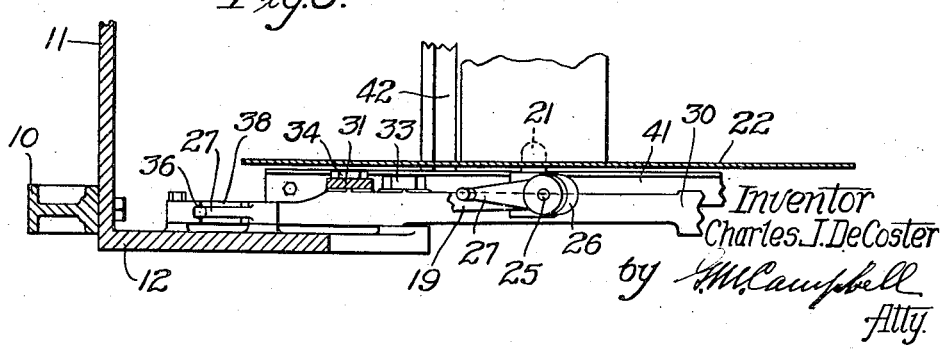
Inventor
Charles J. DeCoster

UNITED STATES PATENT OFFICE.

CHARLES J. DE COSTER, OF CHICAGO, ILLINOIS, ASSIGNOR TO WESTERN ELECTRIC COMPANY, INCORPORATED, OF NEW YORK, N. Y., A CORPORATION OF NEW YORK.

ATTACHMENT FOR REELING MACHINES.

1,416,000.      Specification of Letters Patent.      Patented May 16, 1922.

Application filed September 3, 1920. Serial No. 407,934.

*To all whom it may concern:*

Be it known that I, CHARLES J. DE COSTER, a citizen of the United States, residing at Chicago, in the county of Cook and State of Illinois, have invented certain new and useful Improvements in Attachments for Reeling Machines, of which the following is a full, clear, concise, and exact description.

This invention relates to an attachment for reeling machines, and more particularly to a reel lifting and lowering mechanism for winding and serving machines.

The principal object of this invention is to provide a mechanism whereby heavy, cumbersome reels may be easily and quickly lifted from a reel receiving position to an operative position on a winding machine and back to the receiving position.

Another object of the invention is to provide means for quickly securing a reel to be lifted to the lifting mechanism and releasing it therefrom when desired.

Other features of the invention relate to the adjustability of parts whereby the mechanism can be adapted to accomodate reels of different diameters and widths.

The mechanism embodying the features of this invention preferably comprises two pivotal lifting arms actuated by a foot lever through a connecting link adapted to be adjusted to reels of different diameters. The lifting arms are equipped with reciprocal reel lifting studs whereby a reel may be quickly secured to or released from the lifting arms.

In the drawings—

Fig. 4 is a view similar to Fig. 1 with the parts in a position which allows the reels to be lowered upon the upward movement of the long arm of the foot treadle;

Fig. 5 is a partial view similar to Fig. 4 with the parts shown in a position where the reel has been lowered and another reel placed in position and which upon a depression of the long arm of the foot treadle will be raised into operative position and locked in such position, and Fig. 6 is a partial plan section taken on the line 6—6 of Fig. 1.

Figure 1:
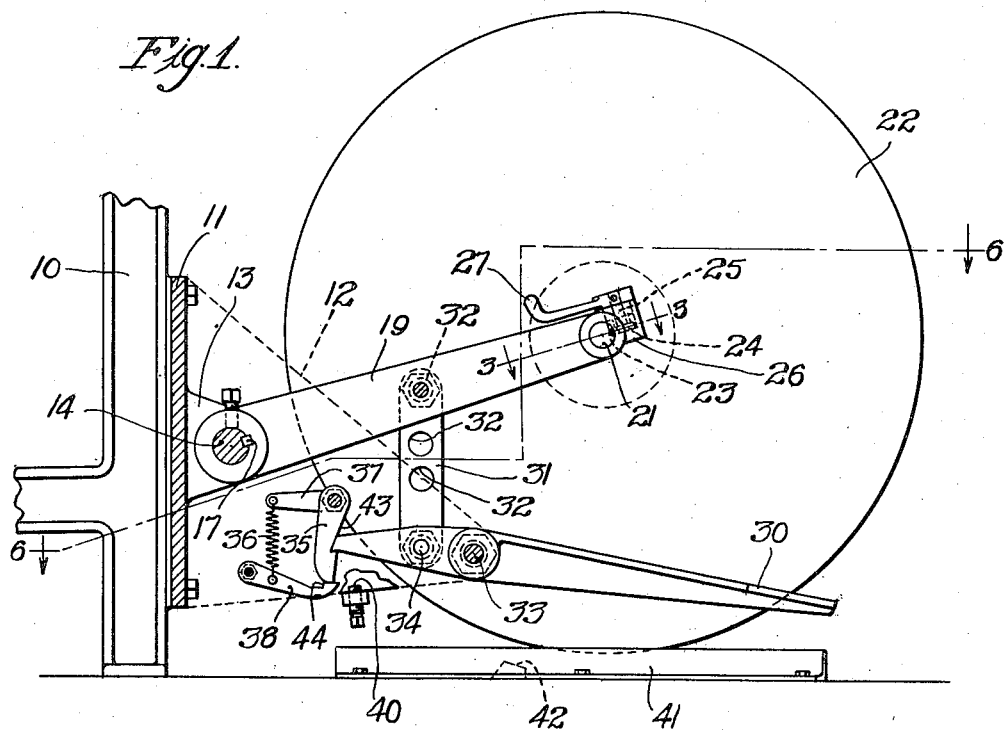
Fig. 1 is a side elevation of the reel lifting and lowering mechanism shown in connection with the supply end of a winding machine, the supporting bracket being shown partly cut away but indicated in dotted outline.
Figure 2:
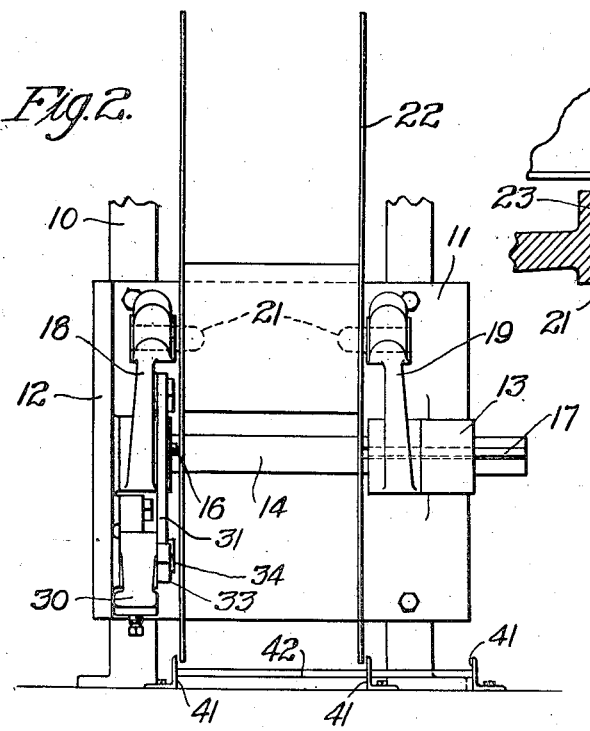
Fig. 2 is an end elevation from the right-hand side thereof.
Figure 3:
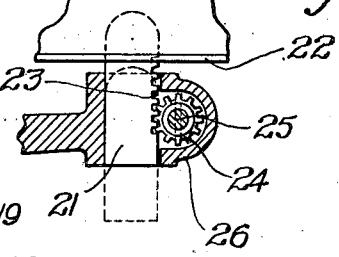
Fig. 3 is an enlarged detail cross sectional view taken on the line 3—3 of Fig. 1 showing the reel centering and supporting stud actuating means.

As shown in the drawings, 10 represents a portion of a frame of a winding machine to which is secured a supporting bracket 11. Carried on the bracket 11 and supported by side members 12 and 13 thereof is a shaft 14 which has splined thereon, as indicated at 16 and 17, reel lifting arms 18 and 19. The arms 18 and 19 are held in position on the shaft 14 against the side members 12 and 13 by set screws as indicated. The arms 18 and 19 each carry in a suitable opening in their free ends a centering or reel supporting stud 21 which enters a central opening in each flange of a reel 22. Each stud 21 has a rack 23 cut in its peripheral surface which is engaged by gears 24 secured to shafts 25 suitably positioned in housings 26 carried on the lifting arms. Levers 27 suitably secured to the shafts 25 provide for revolving the gears 24 which, due to their engagement with the racks 23 on the studs 21, act to move the studs in or out of the openings in the reel 22. The shaft 14 projects outside of the side member 13 a distance which allows the arm 19 to be removed from its position inside of the member 13, as shown in the drawings, and placed on the outside thereof to accommodate a reel wider than the reel 22.

The reel lifting arm 19 is connected to a foot lever 30 through a connecting link 31 pivoted to the arm 19 intermediate its ends. Several holes 32, 32 are provided in the link to take care of the different diameter reels. The foot lever 30 is pivoted to the side member 12 at 33 and the connecting link 31 pivoted to the short arm of the foot lever 30 at 34. When the foot lever 30 is depressed the lifting arms are swung upward carrying the reel therebetween, and a latch 35 carried on the side member 12 engages the end of the foot lever and holds it in its normal position.

A tension spring 36, one end secured to an arm 37 on the latch 35 with its other end secured to a second latch 38, holds the latch 35 in engagement with the foot lever. The latch 38 acts to hold the latch 35 out of the path of the end of the foot lever when the reel is being lowered, as clearly shown in Fig. 4.

An adjustable stop 40 carried on the side member 12 limits the downward movement of the short arm of the foot lever to bring the supporting studs 21 at their proper distance from the floor while the empty reel is being replaced by a full reel. The reels are guided into place by guides 41, 41 and against a stop 42 which can be moved backward or forward when a different diameter reel is to be used.

In the operation of this mechanism the operator, when it is desired to lower an empty reel and replace it by a full one, presses downward on the foot lever 30 which causes the short arm thereof to move up and along an inclined surface 43 on the latch 35. This movement upward of the short arm of the foot lever swings the latch 35 about its pivot and against the action of the spring 36 until its end engages behind a shoulder 44 on the latch 38 with the spring 36 holding them in engagement. The reel may now be lowered, the operator merely allowing the long arm of the foot lever to swing upward, due to the weight of the reel, which causes the short arm thereof to move downward and engage the end of the latch 38 to disengage the latch 35 from the latch 38, after which it rests against the adjustable stop 40 with the reel resting on the floor. This position of the mechanism is clearly shown in Fig. 5. The levers 27 are now turned to draw the supporting studs 21 from the openings in the reel after which the empty reel is free to be replaced by a full one. After placing a full reel against the stop 42 the levers 27 are turned to cause the studs 21 to enter the openings in the reel after which the operator depresses the foot lever and, due to the leverage, the full reel is raised into position with a minimum effort. In depressing the long arm of the foot lever the short arm thereof moves upward and is engaged by the latch 35.

What is claimed is:

1. An attachment for reeling machines, comprising pivotal reel lifting arms adapted to hold a reel, an actuating lever therefor, connecting means between said arms and said lever, means cooperating therewith to automatically hold or release said lever upon actuation thereof, and supporting means for the lifting mechanism.

2. An attachment for reeling machines, comprising pivotal reel lifting arms adapted to hold a reel, an actuating lever therefor, connecting means between said arms and said lever adapted to be adjusted therebetween whereby different diameter reels may be handled, means cooperating with said lever to automatically hold or release said lever upon actuation thereof, adjustable means for holding said reel lifting arms the required distance from a reel receiving position in their movement downward, and supporting means for the lifting mechanism.

3. An attachment for reeling machines, comprising pivotal reel lifting arms adapted to hold a reel, an actuating lever therefor, connecting means between said arms and said lever, spring actuated latches cooperating with said lever to automatically hold or release said lever upon actuation thereof, means for holding said reel lifting arms the required distance from a reel receiving position in their movement downward, and supporting means for the lifting mechanism.

4. An attachment for reeling machines, comprising pivotal reel lifting arms adapted to hold a reel, a common shaft to which said arms are secured, one of said arms adapted to be moved on said shaft to accommodate reels of different width, an actuating lever for said arms, connecting means between said arms and said lever, means cooperating therewith to automatically hold or release said lever upon actuation thereof, and supporting means for the lifting mechanism.

In witness whereof, I hereunto subscribe my name this fourteenth day of August, A. D. 1920.

CHARLES J. DE COSTER.